E. M. LOHR.
CART.
APPLICATION FILED AUG. 23, 1913.
1,102,346.
Patented July 7, 1914.
2 SHEETS—SHEET 1.
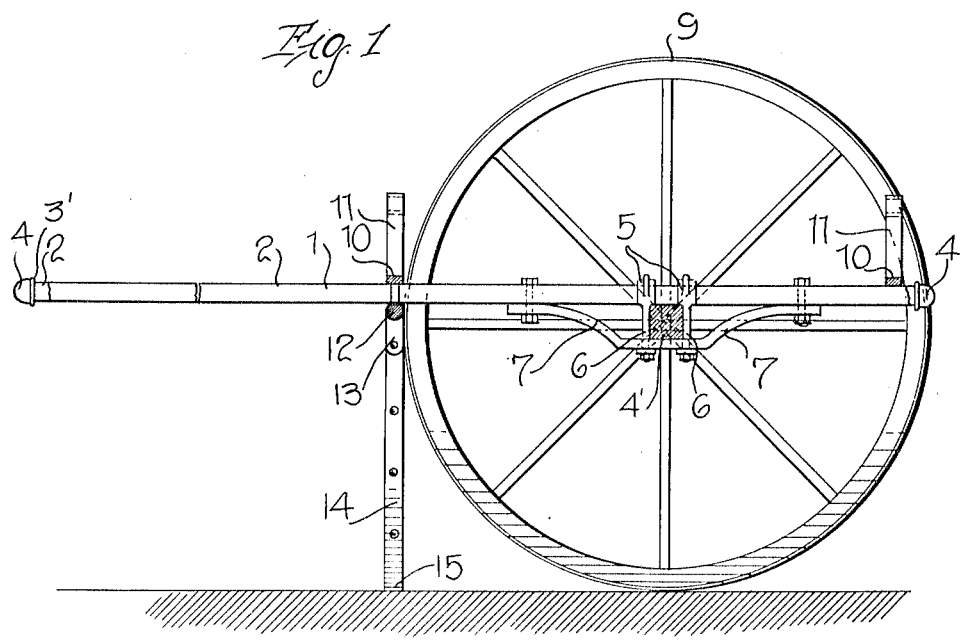
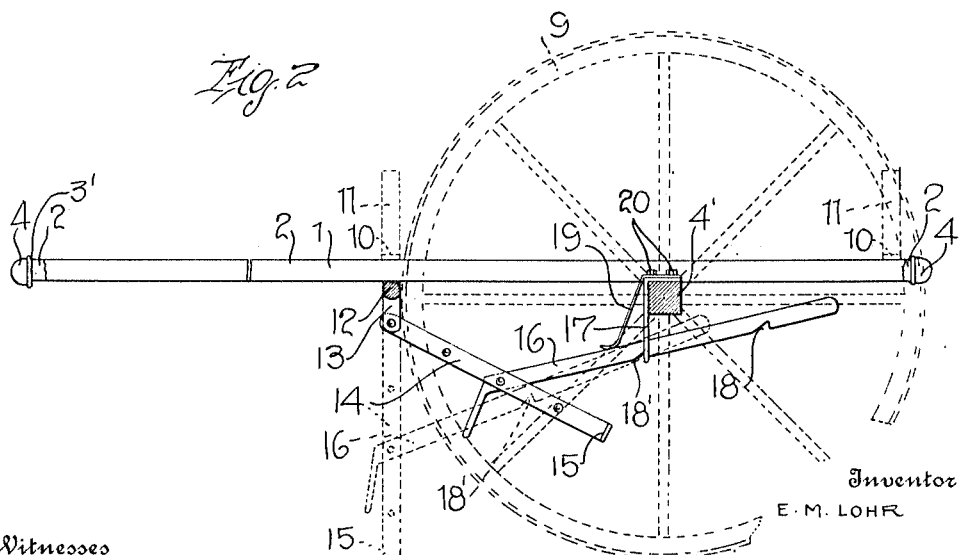

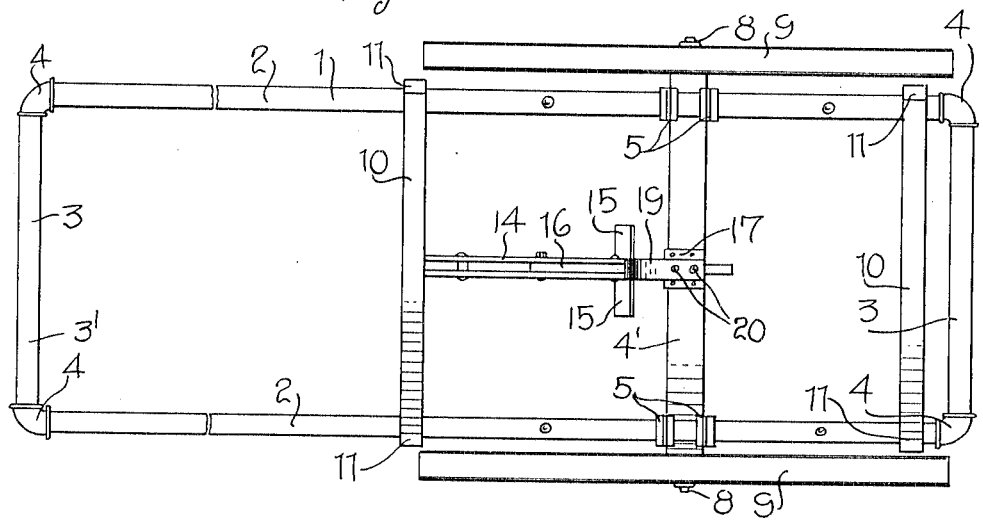
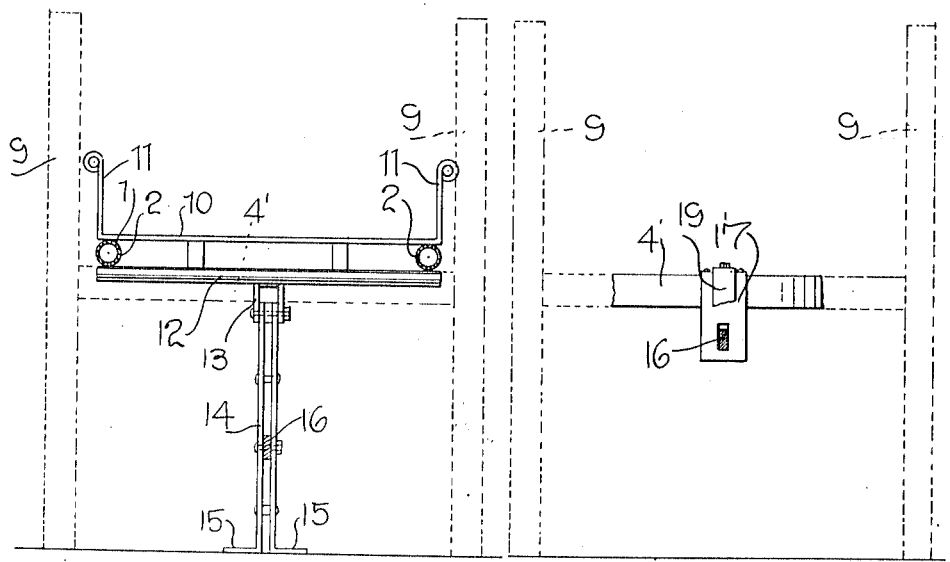

UNITED STATES PATENT OFFICE.

EMMET M. LOHR, OF KINGS MOUNTAIN, NORTH CAROLINA.

CART.

1,102,346.  Specification of Letters Patent.  Patented July 7, 1914.

Application filed August 23, 1913. Serial No. 786,309.

*To all whom it may concern:*

Be it known that I, EMMET M. LOHR, a citizen of the United States, residing at Kings Mountain, in the county of Cleveland and State of North Carolina, have invented certain new and useful Improvements in Carts, of which the following is a specification, reference being had to the accompanying drawings.

This invention relates to new and useful improvements in carts, and more particularly to the kind that are generally known as hand push carts, the object of the invention being to provide a cart which is particularly adapted for conveying barrels, boxes, sacks of grain and flour and various other similar articles where there is only a short distance to go, and it may also be put to various uses to which it might be applicable.

Another object of the invention is the provision of a cart of the above character which will possess advantages in points of efficiency and durability, is inexpensive to manufacture and at the same time is simple in construction and operation.

With the above and other objects in view, the invention consists in the novel features of construction and the combination and arrangement of parts hereinafter more fully described, pointed out in the claims, and shown in the accompanying drawings, in which—

Figure 1 is a longitudinal sectional view of a cart constructed in accordance with my invention illustrating the standard in its lowered position; Fig. 2 is a similar view illustrating the standard in its raised position; Fig. 3 is a top plan view; Fig. 4 is a transverse sectional view; and Fig. 5 is a similar view illustrating the notched plate which is adapted for engagement by the actuating lever.

Referring more particularly to the drawings, 1 indicates the frame of my improved cart which comprises two longitudinal side bars 2 and the transverse end pieces 3 which are suitably connected by means of the elbows 4. In the construction of this frame, I preferably construct the same of one-inch pipe, any other suitable size may be used if desired, according to the strength desired in the frame of the cart. Adjacent one end of the frame are the axle bearings 5 which are suitably secured to the longitudinal side bars 2 by means of the U-bolts 6 and further held in position by means of the brace members 7. The medial portion of this axle 4' is substantially rectangular in cross section and is provided at each end with the usual spindles 8 upon which are mounted the wheels 9.

One end of the frame 1 comprises the handle portion of the cart, as illustrated at 3', and mounted upon the opposite end of the frame and also at the medial portion thereof are the bolsters 10 having up-turned ends 11 whereby barrels, boxes and other similar articles may be readily mounted upon the frame of the cart and securely retained in position. It will readily be apparent that if it be so desired, a suitable box or receptacle may be mounted upon the frame and secured to the bolsters whereby various small articles may be transported from place to place.

Extending transversely of the frame and arranged beneath the central bolster is a cross bar 12 from which depends the U-shaped bracket 13. Pivotally secured at its upper end to the bracket 13 is a foot or standard 14, said standard comprising two parallel upright bars which are arranged between the arms of the bracket and pivotally secured thereto, the lower ends of said bars being out-turned as shown at 15, to provide a suitable foot piece whereby when the standard is in its upright position, the cart will be supported in a horizontal position.

A retaining lever 16 is provided, one end of which is arranged between the medial portions of the bars comprising the standard 14 and the other end thereof movably mounted within the slotted plate 17. From the accompanying drawings it will be apparent that the free end of the lever is provided with a notch 18, and a second notch 18' is provided at the medial portion of the lever.

In the practical use of my device, when it is desired to arrange the frame of the cart in a horizontal position and raise the same above the standard 14, the lever 16 is moved within the plate 17 until the notch 18 at the end of the lever engages with the lower end of the notch in the plate. From this it will be seen that the standard 14 will be securely held against any lateral movement when in an operative or inoperative position. When it is desired to raise the standard so that the same may be moved from place to place, the lever 16 is moved forwardly within the notched plate until the recess 18' engages with the lower edge of the notch within the plate. Thus it will be seen that the standard will be securely retained in its raised position. In order to securely retain the lever against longitudinal movement when in its various adjusted positions, I provide a spring plate 19 which is rigidly secured at one end to the axle 4', as shown at 20, and the other end thereof curved downwardly and upwardly to frictionally engage the upper face of the lever 16 to securely retain the notches 18 and 18' in engagement with the lower edge of the notch within the plate 17. From this it will be seen that I have provided a simple and durable cart which, in accordance with the construction thereof, possesses great strength for various purposes to which it may be applicable. It will also be apparent that the device can be manufactured and placed in condition for use at a very small cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim, is:

1. A device of the class described including a frame normally disposed in a horizontal position, an axle arranged beneath said frame at one end thereof, a transverse bar arranged beneath the central portion of the frame, a U-shaped bracket depending from said bar, a standard including spaced parallel upright bars having their upper ends pivotally mounted between the arms of said bracket, the lower ends of said bars being outturned in opposed directions, a slotted plate carried by the axle, and a lever having one end secured to the standard and the other end adjustably mounted within said plate.

2. A device of the class described including a frame normally disposed in a horizontal position, an axle arranged beneath said frame, a transverse bar arranged beneath the central portion of the frame, a U-shaped bracket depending from said bar, a standard including spaced parallel bars having their upper ends pivotally connected between the arms of said bracket, said standard being normally disposed in an upright position to support the frame, a slotted plate suspended from the axle, a retaining lever provided with spaced recesses and having one end arranged between said spaced bars of the standard and pivotally secured thereto, and the other end of said lever being adjustable within the slotted plate, and a spring member having one end secured to the axle and the other end yieldably bearing against the lever to retain the same in its effective position.

In testimony whereof I hereunto affix my signature in the presence of two witnesses.

EMMET M. LOHR.

Witnesses:
  G. W. KENDRICK,
  LESLIE McGUIRE.